Figure 1:
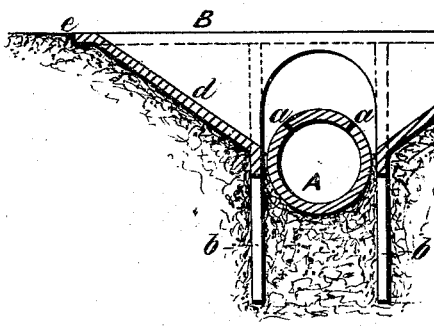

2 Sheets--Sheet 1.

I. BROWN.
Irrigating-Apparatus.

No. 152,825.     Patented July 7, 1874.

WITNESSES

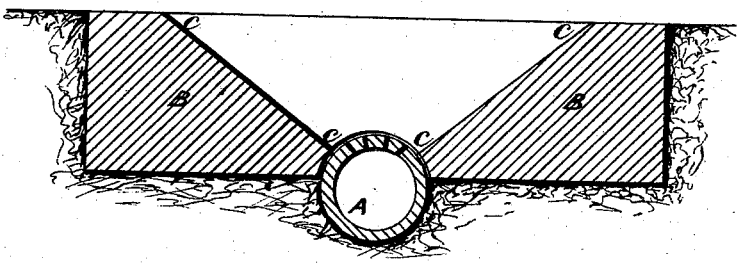
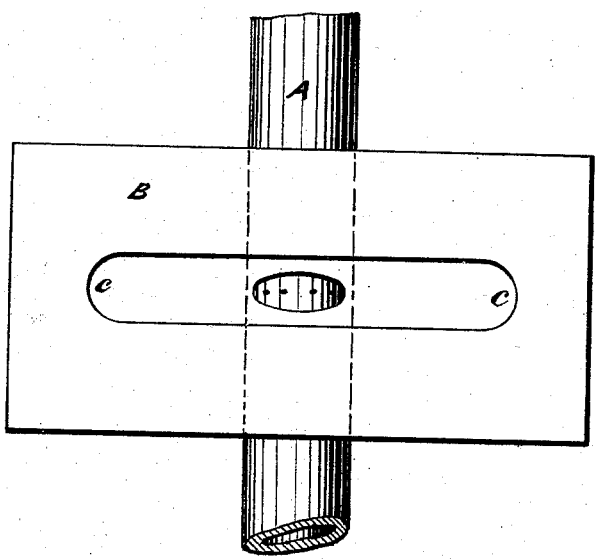

UNITED STATES PATENT OFFICE.

ISAAC BROWN, OF EDINBURGH, NORTH BRITAIN.

IMPROVEMENT IN IRRIGATING APPARATUS.

Specification forming part of Letters Patent No. 152,825, dated July 7, 1874; application filed October 15, 1873.

*To all whom it may concern:*

Be it known that I, ISAAC BROWN, of Elm Croft Grange, Edinburgh, in the county of Mid-Lothian, North Britain, have invented an Improved Irrigating Apparatus, of which the following is a specification:

My invention relates to apparatus by which to effect the irrigation or moistening and manuring of land, and especially grazing-land, by directing water, town-sewage, or liquid manure thereon, in the form of numerous fine jets, which, by intermingling, will produce a light rain-shower or spray over the land. This rain-shower or spray is obtained, according to my invention, by the use of a series of soft-metal pipes, by preference composed of lead, laid, as hereinafter described, below the ground or upon the surface, and punctured or perforated with exceedingly minute perforations, made by preference with a needle-pointed instrument, which punctures the pipe from the outside, and thus produces fine perforations, the smaller diameter of which is on the interior of the pipe. These lead pipes may be laid parallel to each other, or otherwise, and are connected to one or more mains laid under the surface—such mains being connected with lift and force pumps worked by steam or other motive-power engines, or the said mains may be supplied by gravitation in cases where a sufficient head-pressure is obtainable. The length and diameter of the mains and punctured branch pipes, and the distance between the latter, will depend upon the forcing-power of the pumps, or the head-pressure available. I have found that with a pressure of one hundred and fifty pounds the mains may be from three inches and upward internal diameter, and will conduct the water-sewage or liquid manure to a great distance, while the punctured branch pipes may be about one inch and upward in internal diameter, and extend about two hundred yards in length on each side of the main, at intervals of about fifteen yards to thirty yards, according to the pressure employed. The extreme minuteness of the punctures in the lead pipes is essential to the effectual working of my improved system of irrigation and manuring, since, if pipes be employed with the usual size of perforations, it will be found that the water cannot practically be supplied thereto with sufficient rapidity to maintain their fall throughout such length or distance as is requisite for the efficient carrying out of this invention, but that these pipes will in fact empty themselves through the perforations near the main before the water can be driven to the extreme ends thereof, owing to the too large dimensions of the perforations. On forcing the liquid into the mains by force-pumps, or in supplying it under the requisite pressure by gravitation, it will speedily fill the various ramifications of mains and punctured pipes, and will issue from the minute punctures in the latter in the form of a fine-rain shower or spray, which by descending onto the land will impart the desired moisture thereto.

In applying my invention to the irrigation or manuring of land the pipes may be placed above, but I place them by preference below, the surface of the ground, and thus prevent them from being tampered with, removed, or injured; and for this purpose a furrow and a groove are first cut by means of a plow—the groove being cut out or formed along the bottom of such furrow—in which the pipe is laid, and the earth or turf is then turned back and laid level over the pipe so as to fill up the furrow again. Square pieces of turf are then to be cut out at intervals along the track of the covered pipe, where it is required to apply shields to the perforated portion of the said pipes. These shields, which may be made of iron, earthenware, or other material applicable to the purpose, consist of arch-shaped lengths or sections, which are sunk into the ground, and cover the perforated portions of the pipe from which the jets issue. These arch-shaped shields have a narrow slot (say, about an inch wide) cut across them, which slot extends down to a level with the pipe, or nearly so, and serves for the passage of the jets of liquid. The said arch-shaped shields, when made of metal, are also provided with flanges or wings, which serve to prevent the grass from growing and choking up the narrow slot or passage, which flanges or wings are inclined upward, in order to allow free passage for the jets of liquid to the surface of the ground. I also propose to protect the jet-holes by applying bricks or any suitable material for a shield at intervals (where the pipes are perforated); such bricks being made with slots to allow the passage of the jet, these slots extending down to the surface of the pipe, the bricks having an arch-shaped recess at their bottom, which fits onto and over the pipe. These shield-bricks when laid down are on a level with the surface of the ground. They are laid down over the pipe in the manner described for the metal shields before referred to.

By these arrangements, sufficient space will be left on the shields for the escape of the liquid jets, while at the same time they present an obstruction to the entrance of the feet of men or animals, and will thus protect the pipe from injury thereby.

For pleasure-grounds, or other situations where the ground is not liable to be traversed by heavy animals, the metal or other shields above described may be dispensed with, the pipes being simply laid below the surface in a groove, at the bottom of a furrow, produced in the manner above described. The turf which is laid over them serves as a sufficient shield or protection, while spaces which are cut out in the turf at intervals above the perforations serve to allow for the free passage of the liquid jets to the surface.

Figure 3:
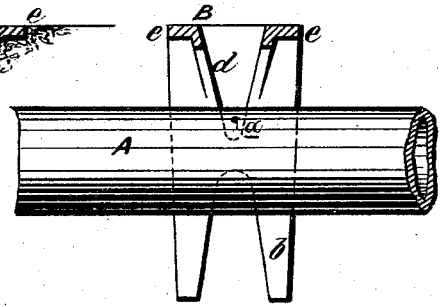
Figure 2:
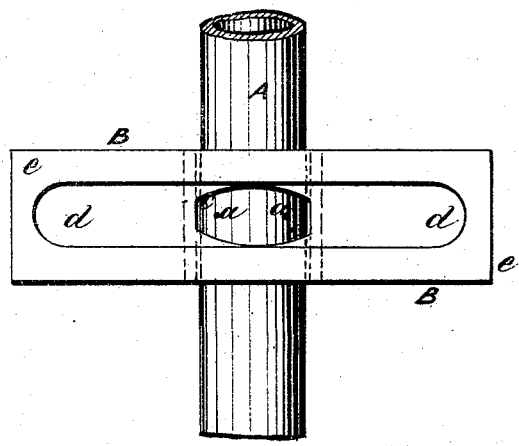

Figure 1 of my drawings represents a transverse section of a land-irrigating perforated pipe, laid and protected or shielded according to my invention. Fig. 2 is a corresponding plan of the same; and Fig. 3 is a vertical transverse section of the shield over the pipe.

A is the perforated irrigating-pipe, composed of lead or other suitable material, which is sunk below the surface of the ground in a groove made in the bottom of a furrow, as already explained. B represents one of a series of shields laid at intervals across the pipe A, at the parts where the perforations $a\ a$ occur, the top of the said shield or protector being level with the surface of the ground. $b\ b$ are two projecting pieces formed in one with or attached to the said shield, such pieces being forced into the ground, and fitting one on each side of the pipe A. $c\ c$, Fig. 2, is the slot or opening, which is made in the shield, and is disposed transversely over the pipe A, where the perforations or jet-holes $a$ occur. From each end of this slot $c$ a narrow inclined channel, $d$, rises to the surface, and terminates in a flange, $e$, which extends along the four edges of the upper part of the shield. It will thus be seen that while this shield entirely protects the pipe from injury by downward pressure from the feet of men or animals, it at the same time allows free play for the jets.

Figs. 4 and 5 represent, respectively, in section and plan, the application of a brick for protecting the perforated parts of the pipe A. B is a brick laid transversely across the pipe, a curved recess being made in the under side of the brick to fit over the pipe, and a slot or oblong perforation, $c$, is formed through the brick, and disposed transversely over the pipe where the perforations or jet-holes occur, in order to protect the jet-orifices from injury, the ends of the slot being made to flare outward, or being inclined, as shown, so as not to interfere with the free play of the liquid jets.

When using town-sewage according to my invention, it is in the first place to be intercepted by a filter-screen.

I also propose to manure land, and more especially grazing-land, by first covering the land with artificial or other solid or dry manure or fertilizing agents, such, for example, as guano, and then causing a fine shower or spray of water to descend upon the manure, in the manner and by the means hereinbefore described, whereby the soluble constituents of such manures or fertilizing agents may be dissolved with certainty, and without loss of time, and be at once conducted to the absorbents or roots of the plants, even in the driest seasons.

I claim as my invention—

1. The within-described perforated irrigating-pipes, laid in grooved furrows at or below the surface of the ground, and protected at points directly over the perforations by suitable shields, all substantially as and for the purpose specified.

2. The slotted shields or covers B, constructed substantially as described, for application to the perforated irrigating-pipes A.

In witness whereof I have signed my name to this specification in presence of two subscribing witnesses.

ISAAC BROWN.

Witnesses:
A. McCASKIE,
  *Solicitor Supreme Courts of Scotland, Edinburgh.*
JOHN BROWN,
  *7 St. Andrew Square, Edinburgh.*